(12) United States Patent
Sako

(10) Patent No.: US 8,243,156 B2
(45) Date of Patent: Aug. 14, 2012

(54) IMAGE-CAPTURING APPARATUS AND IMAGE-CAPTURING CONTROL METHOD

(75) Inventor: Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 12/218,471

(22) Filed: Jul. 15, 2008

(65) Prior Publication Data

US 2009/0027513 A1    Jan. 29, 2009

(30) Foreign Application Priority Data

Jul. 24, 2007   (JP) ................. 2007-192139

(51) Int. Cl.
*H04N 5/228* (2006.01)
(52) U.S. Cl. ............... 348/222.1; 348/208.99
(58) Field of Classification Search ............... 348/222.1, 348/208.1, 208.2, 208.14–208.16
See application file for complete search history.

(56) References Cited

U.S. PATENT DOCUMENTS

| | | | |
|---|---|---|---|
| 5,708,863 A * | 1/1998 | Satoh et al. ............... 396/52 |
| 6,893,132 B2 * | 5/2005 | Mori et al. ............. 348/E7.087 |
| 2002/0039203 A1 | 4/2002 | Endo et al. |
| 2003/0151672 A1* | 8/2003 | Robins et al. ............. 348/208.6 |
| 2004/0239776 A1 | 12/2004 | Shinohara et al. |
| 2006/0171694 A1 | 8/2006 | Kamimura et al. |
| 2006/0197845 A1* | 9/2006 | Masaki ..................... 348/224.1 |
| 2008/0316339 A1* | 12/2008 | Sugino et al. ............ 348/231.99 |
| 2009/0051785 A1 | 2/2009 | Kamada et al. |
| 2009/0051788 A1 | 2/2009 | Kamada et al. |

FOREIGN PATENT DOCUMENTS

| | | |
|---|---|---|
| CN | 1816111 A | 8/2006 |
| JP | 06-030374 A | 2/1994 |
| JP | 06030374 * | 4/1994 |
| JP | 07-107351 A | 4/1995 |
| JP | 08-279954 A | 10/1996 |
| JP | 10-150598 A | 6/1998 |
| JP | 2002-022463 A | 1/2002 |
| JP | 2002-034030 A | 1/2002 |
| JP | 2003-060972 A | 2/2003 |
| JP | 2004-212232 A | 7/2004 |
| JP | 2004-333921 A | 11/2004 |
| JP | 2005-276220 A | 10/2005 |

(Continued)

OTHER PUBLICATIONS

"Augmented Album: Situation-dependent System for a Personal Digital Video/Image Collection", Hewagamage et al., 2000 IEEE Int'l Conference on Multimedia Computing & Systems, New York, Jul. 30, 2000 to Aug. 2, 2000, vol. 1, pp. 323-326.

(Continued)

*Primary Examiner* — Gevell Selby
(74) *Attorney, Agent, or Firm* — Wolf, Greenfield & Sacks, P.C.

(57) ABSTRACT

An image-capturing apparatus includes an image-capturing unit configured to capture an image of a subject in order to obtain captured image data; a storage processor configured to perform a process for storing the captured image data obtained by the image-capturing unit; an operation unit configured to perform a self-timer image-capturing operation; a motion detector; and a controller configured to, when the self-timer image-capturing operation is performed using the operation unit, controlling, on the basis of detection information obtained by the motion detector, a shutter operation in which the captured image data obtained by the image-capturing unit is stored by the storage processor after a self-timer set time period passes.

14 Claims, 8 Drawing Sheets

FOREIGN PATENT DOCUMENTS

| | | |
|---|---|---|
| JP | 2006-140695 A | 6/2006 |
| JP | 2006-251938 A | 9/2006 |
| JP | 2007-066251 A | 3/2007 |
| JP | 2007-109049 A | 4/2007 |
| JP | 2007-123953 A | 5/2007 |
| JP | 2007-150993 A | 6/2007 |
| JP | 2007-172035 A | 7/2007 |
| JP | 2007-206099 A | 8/2007 |
| WO | WO 90/08371 A1 | 7/1990 |

OTHER PUBLICATIONS

"Smart Sight: A Tourist Assistant System", Yang et al., Proc 3rd Int'l Syposium on Wearable Computers, 1999, pp. 73-78 (retreived on Oct. 30, 2008 from http://isl.ira.uka.de/fileadmin/publicationfiles/ISWC99-jie.pdf.

* cited by examiner

US 8,243,156 B2

IMAGE-CAPTURING APPARATUS AND IMAGE-CAPTURING CONTROL METHOD

CROSS REFERENCES TO RELATED APPLICATIONS

The present invention contains subject matter related to Japanese Patent Application JP 2007-192139 filed in the Japanese Patent Office on Jul. 24, 2007, the entire contents of which are incorporated herein by reference.

BACKGROUND OF THE INVENTION

1. Field of the Invention

The present invention relates to an image-capturing apparatus and an image-capturing control method, and relates to a technology for controlling a shutter operation on the basis of detection information on the motion of a subject and an image-capturing apparatus when image capturing is to be performed by using a self-timer function.

2. Description of the Related Art

Hitherto, in an image-capturing apparatus, such as a digital still camera, there has been available a self-timer function that is designed so that, when an image of a subject is to be captured, a shutter operation is performed after a self-timer set time period, which is a fixed time period, passes from the time when the shutter operation is performed. This self-timer function is, for example, a function used when a photographer who performs a shutter operation is also a subject.

However, when image capturing is to be performed using a self-timer function, it is not possible for the photographer to confirm the status of the subject at the timing at which the shutter operation is performed. For example, even if the photographer wants a captured image in a state in which a subject is stationary, it is considered that image capturing may be performed when the subject is moving and a captured image not intended by the photographer may be obtained.

Japanese Unexamined Patent Application Publication No. 2007-123953 discloses a technology in which moving body information on a subject is detected and a timer is started until a shutter is released on the basis of this information.

SUMMARY OF THE INVENTION

Accordingly, in the present invention, when a subject is to be captured using a self-timer function, control for performing more appropriate image capturing is performed. Then, it is desirable to prevent occurrence of a problem in the captured image resulting from movement of the subject or the image-capturing apparatus and to be capable of obtaining an optimum captured image desired by a photographer.

According to an embodiment of the present invention, there is provided an image-capturing apparatus including: image-capturing means for capturing an image of a subject in order to obtain captured image data; storage processing means for performing a process for storing the captured image data obtained by the image-capturing means; operation means for performing a self-timer image-capturing operation; motion detection means; and control means for, when the self-timer image-capturing operation is performed using the operation means, controlling, on the basis of the detection information obtained by the motion detection means, a shutter operation with which the captured image data is to be stored by the storage processing means when a self-timer set time period ends.

The motion detection means may detect the motion of the subject by performing image analysis of the captured image data obtained by the image-capturing means, and the control means may control the shutter operation on the basis of the detection information on the motion of the subject by the motion detection means.

The motion detection means may detect the motion of a person as a subject, and the control means may control the shutter operation on the basis of the detection information on the motion of the person detected to be a subject by the motion detection means.

The motion detection means may detect the motion of the image-capturing apparatus.

In the motion detection means, the motion of the image-capturing apparatus may be detected by using a sensor for detecting the motion of the image-capturing apparatus.

In the motion detection means, the motion of the image-capturing apparatus may be detected by performing image analysis of the captured image data obtained by the image-capturing means.

On the basis of the detection information obtained by the motion detection means, the control means may perform a process for extending the self-timer set time period when the subject is moving when the self-timer set time period passes.

On the basis of the detection information obtained by the motion detection means, the control means may perform a process for extending the self-timer set time period when a person as a subject is moving when the self-timer set time period passes.

On the basis of the detection information obtained by the motion detection means, the control means may perform control for stopping a shutter operation when the subject is moving when the extension time period of the self-timer set time period passes.

On the basis of the detection information obtained by the motion detection means, the control means may perform control for stopping the shutter operation when a person as a subject is moving when the extension time period of the self-timer set time period passes.

The image-capturing apparatus may further include message output means, wherein, on the basis of the detection information obtained by the motion detection means, the control means may perform control for causing the message output means to output a message when a subject is moving when the extension time period of the self-timer set time period passes.

The image-capturing apparatus may further include message output means, wherein, on the basis of the detection information obtained by the motion detection means, the control means may perform control for causing the message output means to output a message when a person as a subject is moving when the extension time period of the self-timer set time period passes.

On the basis of the detection information obtained by the motion detection means, the control means may perform control so that a shutter operation is performed when detection information that the subject is stationary is obtained before the self-timer set time period passes.

On the basis of the detection information obtained by the motion detection means, the control means may perform control so that a shutter operation is performed when detection information that the subject is stationary is obtained before the extension time period of the self-timer set time period passes.

The image-capturing means may have an exposure correction function, and on the basis of the detection information obtained by the motion detection means, the control means may control the image-capturing means so that exposure correction is performed when the amount of incident light from the subject is changed during the self-timer set time period.

On the basis of the detection information obtained by the motion detection means, the control means may perform control for stopping a shutter operation when detection information that the image-capturing apparatus has moved during the self-timer set time period is obtained.

The image-capturing apparatus may further include message output means, wherein, on the basis of the detection information obtained by the motion detection means, the control means may perform control for causing the message output means to output a message when detection information that the image-capturing apparatus has moved during the self-timer set time period is obtained.

According to another embodiment of the present invention, there is provided an image-capturing control method for use with an image-capturing apparatus for performing image capturing by using a self-timer function, the image-capturing control method including the steps of: detecting the motion of a subject or that of the image-capturing apparatus during image capturing using the self-timer function; and controlling a shutter operation on the basis of the detection result in the motion detection.

Features of the present invention are that image capturing is performed using a self-timer function in the image-capturing apparatus. The self-timer function is a function that is designed so as for a shutter operation to be performed after a self-timer set time period of, for example, approximately 10 seconds passes. Furthermore, this shutter operation is an operation of retrieving a captured image captured by the image-capturing means and storing it in the storage processing means.

Then, the image-capturing apparatus controls shutter operation on the basis of the image analysis of captured image data of a plurality of frames captured during the self-timer set time period by the image-capturing means and on the basis of detection information on the motion detection process for detecting the motion of the image-capturing apparatus.

For example, when a detection result that the subject is moving is obtained on the basis of the detection information on the motion detection process during the self-timer set time period, the self-timer set time period can be extended so that the performance of the shutter operation can be delayed.

According to the embodiments of the present invention, a motion detection process can be performed during the self-timer set time period, and the shutter operation can be controlled on the basis of the detection information thereof. That is, the shutter operation is delayed while the subject is moving during the self-timer set time period, thereby increasing the possibility that a captured image in a state in which the subject is stationary. Furthermore, even if the shutter operation is delayed, when the subject is still moving, the image capturing is stopped, thereby preventing a captured image not intended by the photographer from being obtained. As a consequence, it is possible to obtain a captured image desired by a photographer.

Furthermore, also, even when the image-capturing apparatus is moving, the image capturing is stopped, making it possible to prevent a captured image not intended by a photographer from being obtained.

DESCRIPTION OF THE PREFERRED EMBODIMENTS

Embodiments of the present invention will now be described below. Descriptions will be given in the following order.
1. Example of Configuration of Image-Capturing Apparatus
2. Image-Capturing Processing Operation Example I
3. Image-Capturing Processing Operation Example II
4. Image-Capturing Processing Operation Example III
5. Image-Capturing Processing Operation Example IV
6. Image-Capturing Processing Operation Example V
7. Image-Capturing Processing Operation Example VI
8. Image-Capturing Processing Operation Example VII
9. Modification 1. Example of Configuration of Image-Capturing Apparatus Here, a description will be given by using, for example, an image-capturing apparatus, which is, for example, a digital still camera, as an example of an image-capturing apparatus of an embodiment of the present invention.

Figure 1:
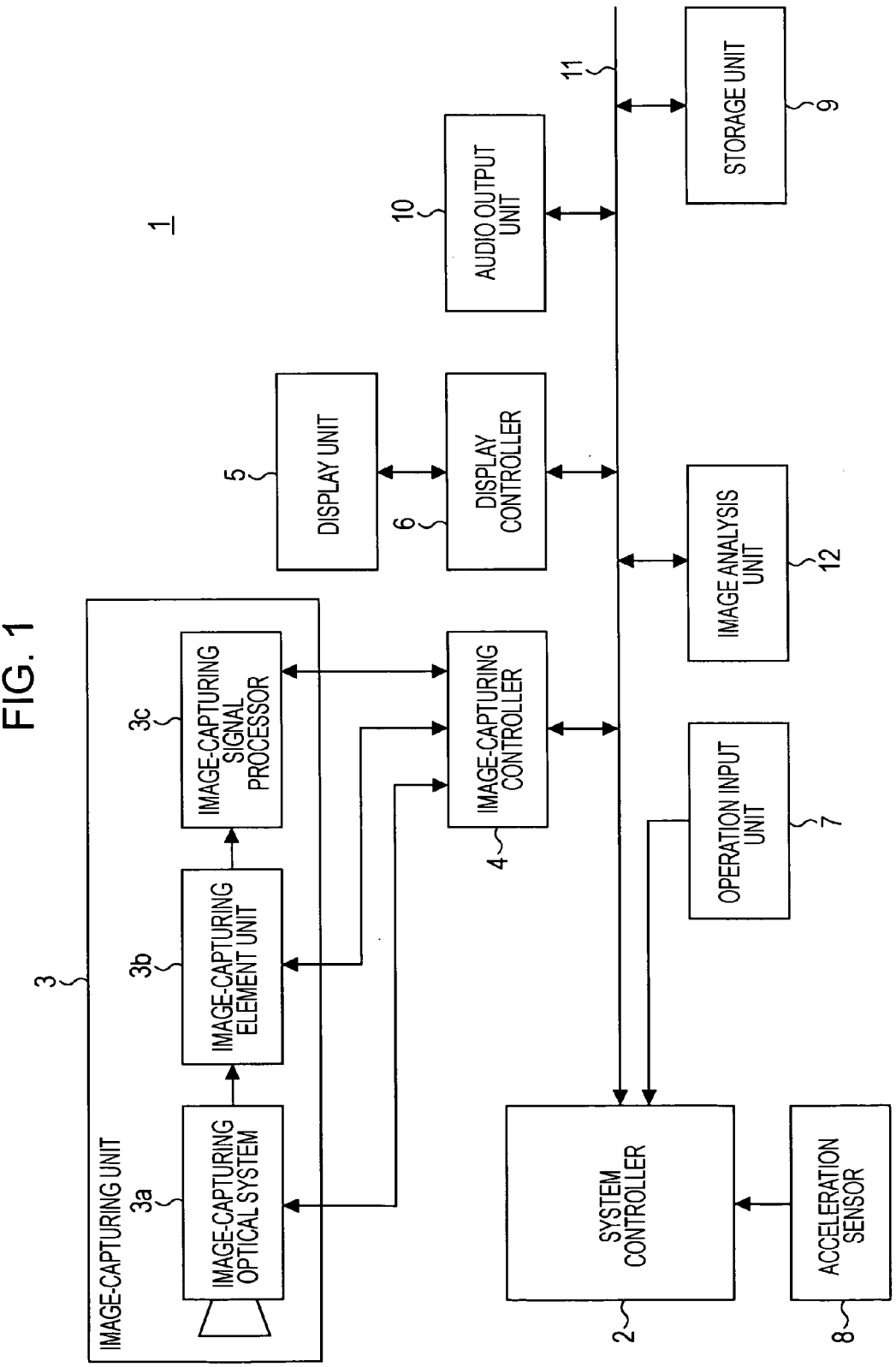
FIG. 1 is a block diagram of an image-capturing apparatus according to an embodiment of the present invention.

FIG. 1 is a block diagram showing the internal configuration of an image-capturing apparatus 1.

As shown in the figure, the image-capturing apparatus 1 includes a system controller 2, an image-capturing unit 3, an image-capturing controller 4, a display unit 5, a display controller 6, an operation input unit 7, an acceleration sensor 8, a storage unit 9, an audio output unit 10, a bus 11, and an image analysis unit 12.

The system controller 2 is formed by a microcomputer including, for example, a CPU (Central Processing Unit), a ROM (Read Only Memory), a RAM (Random Access Memory), a non-volatile memory unit, and an interface unit, and serves as a controller for controlling the entire image-capturing apparatus 1. The system controller 2 performs, in accordance with a program stored in the internal ROM or the like, various kinds of computation processes, and transmission and reception of a control signal and the like to and from each unit via a bus 11, so that each unit performs a necessary operation.

The image-capturing unit 3 includes an image-capturing optical system 3a, an image-capturing element unit 3b, and an image-capturing signal processor 3c.

The image-capturing optical system 3a in the image-capturing unit 3 includes a lens system configured to include an aperture, a zoom lens, a focus lens, and the like; a driving system for causing the lens system to perform a focus operation and a zoom operation; and the like.

In the image-capturing element unit 3b in the image-capturing unit 3, a solid-state image-capturing element array for detecting image-capturing light obtained by the image-capturing optical system 3a and for generating an image-capturing signal by performing photoelectric conversion thereon is provided. The solid-state image-capturing element array is formed as, for example, a CCD (Charge Coupled Device) sensor array or a CMOS (Complementary Metal Oxide Semiconductor) sensor array.

The image-capturing signal processor 3c in the image-capturing unit 3 includes a sample-hold/AGC (Automatic Gain Control) circuit for performing gain adjustment and waveform shaping on a signal obtained by solid-state image-capturing elements, a programmable gain amplifier (PGA), and a video A/D converter, and obtains captured image data as digital data. Furthermore, a white-balance process, a luminance process, a color signal process, and the like are performed on the captured image data.

Image capturing is performed by the image-capturing unit 3 having the image-capturing optical system 3a, the image-capturing element unit 3b, and the image-capturing signal processor 3c, and captured image data is obtained.

The image data obtained by the image-capturing operation of the image-capturing unit 3 is processed by the image-capturing controller 4.

Under the control of the system controller 2, the image-capturing controller 4 performs a process for converting the captured image data into a predetermined image data format and a process for supplying the converted captured image data to the image analysis unit 12, the storage unit 9, and the display controller 6 in response to the operation status.

On the basis of the instruction of the system controller 2, the image-capturing controller 4 performs on/off control of an image-capturing operation in the image-capturing unit 3, driving control of a zoom lens and a focus lens of the image-capturing optical system 3a, control of the sensitivity of the image-capturing element unit 3b and the frame rate, parameter control of each process of the image-capturing signal processor 3c, and setting of execution processes.

For the configuration for performing display to a user in the image-capturing apparatus 1, a display unit 5 and a display controller 6 are provided.

The display unit 5 is provided with a display driving unit for driving a liquid-crystal display or the like. This display driving unit is formed of a pixel driving circuit for displaying image data supplied from the image-capturing controller 4 on, for example, a liquid-crystal display. The pixel driving circuit applies, at a predetermined horizontal/vertical driving timing, a driving signal based on a video signal to each of pixels arranged in a matrix in the liquid-crystal display, so that display is performed.

Under the control of the system controller 2, the display controller 6 drives a pixel driving circuit in the display unit 5 so as to perform predetermined display. That is, display as an imaging monitor in the image-capturing unit 3 is performed.

In order to perform these displays, for example, luminance level adjustment, color correction, contrast adjustment, sharpness (contour enhancement) adjustment, and the like can be performed. Furthermore, generation of an expanded image such that part of image data is expanded or generation of a reduced image, image effect processes, such as soft focus, mosaic, luminance inversion highlight display (enhancement display) of part of an image, changing of atmosphere of the color of the whole, and the like can be performed.

The operation input unit 7 has operation elements such as, for example, keys, buttons, and dials. For example, operation elements used in power-supply on/off operation and used in the operation of the image-capturing system, for example, shutter operation, zoom operation, exposure setting operation, self-timer image-capturing operation, and the like are formed.

The operation input unit 7 supplies information obtained from such operation elements to the system controller 2, and the system controller 2 performs necessary computation processes and control corresponding to these items of information.

The acceleration sensor 8 detects the acceleration of the motion of the image-capturing apparatus 1 and supplies a signal corresponding to this detected acceleration to the system controller 2.

For example, when a user is to capture an image of a subject by using a self-timer function, after the self-timer function is set, it is possible for the acceleration sensor 8 to detect the motion of the image-capturing apparatus 1, such as when the image-capturing apparatus 1 being inclined.

Then, in the system controller 2, a process for receiving a detection value of the acceleration of the motion of the image-capturing apparatus 1 as a signal supplied from the acceleration sensor 8 is performed.

In the present invention, since the motion and the inclination of the image-capturing apparatus 1 need only be able to be detected, an angular-velocity sensor and a vibration sensor may be used in place of the acceleration sensor 8.

The storage unit 9 is used to store various kinds of data. For example, the storage unit 9 is used to store captured image data.

This storage unit 9 may be formed of a solid-state memory such as a RAM or a flash memory, and may also be formed of, for example, an HDD (Hard Disk Drive).

The storage unit 9, rather than being formed as an incorporated recording medium, may also be formed as a recording and reproduction drive compatible with a portable recording medium, for example, a memory card, an optical disc, a magneto-optical disc, a hologram memory, or the like, in which a solid-state memory is contained.

Of course, both a built-in type memory, such as a solid-state memory or an HDD, and a recording and reproduction drive for a portable recording medium may be installed.

Under the control of the system controller 2, the storage unit 9 records and stores the captured image data.

Under the control of the system controller 2, the recorded data is read, and the recorded data is supplied to the system controller 2, the display controller 6, and the like.

The audio output unit 10 includes, for example, an audio generator, a sound synthesizer, an amplifier circuit, a speaker, and the like, and performs audio output of a warning sound, a message, and the like in accordance with instructions from the system controller 2. For example, when the system controller 2 instructs generation of electronic sound and sound synthesis to the audio output unit 10, the audio generator 10 can generate an audio signal as a warning sound and a message sound, and can amplify the generated audio signal by using an amplifier circuit, so that the audio signal is output as audio sound from a speaker.

The configuration of the image-capturing apparatus 1 has been described above, but this is only an example. Of course, addition and deletion of various components can be conceived of in view of examples of operations performed in practice, and functions.

2. Image-Capturing Processing Operation Example I

The image-capturing apparatus 1 of this example having such a configuration is designed to perform a captured-image obtaining processing operation that implements an optimum image obtaining function for obtaining a captured image as a still image of one frame in which a subject is not moving when, for example, a user performs a self-timer image-capturing operation in order to capture an image of the subject.

The captured-image obtaining processing operation as this embodiment will be described below.

Usually, in the image-capturing apparatus 1, a shutter operation is performed by a user by performing a shutter operation of pressing, for example, a shutter key provided in the operation input unit 7, and a captured image as a still image of one frame is obtained.

The shutter operation is a process for storing, as data of one still image, an image of one frame, which is captured at the timing at which a shutter operation is performed. In FIG. 1, the system controller 2 obtains, from the image-capturing controller 4, captured image data of one frame captured by the image-capturing unit 3 at the timing at which the shutter operation is detected, and stores the captured image data in the storage unit 9.

In the case of this embodiment, this shutter operation is performed using the self-timer function, and a captured image as a still image of one frame is obtained. Furthermore, the self-timer function is a function in which a shutter operation is performed after an elapse of a fixed time period from the time when the user performs the self-timer image-capturing operation. The time period from the time when the self-timer image-capturing operation is performed to the time when the shutter operation is performed is, for example, approximately 10 seconds.

At this point, the processing of the system controller 2 for implementing this operation will be described with reference to FIG. 2.

Figure 2:
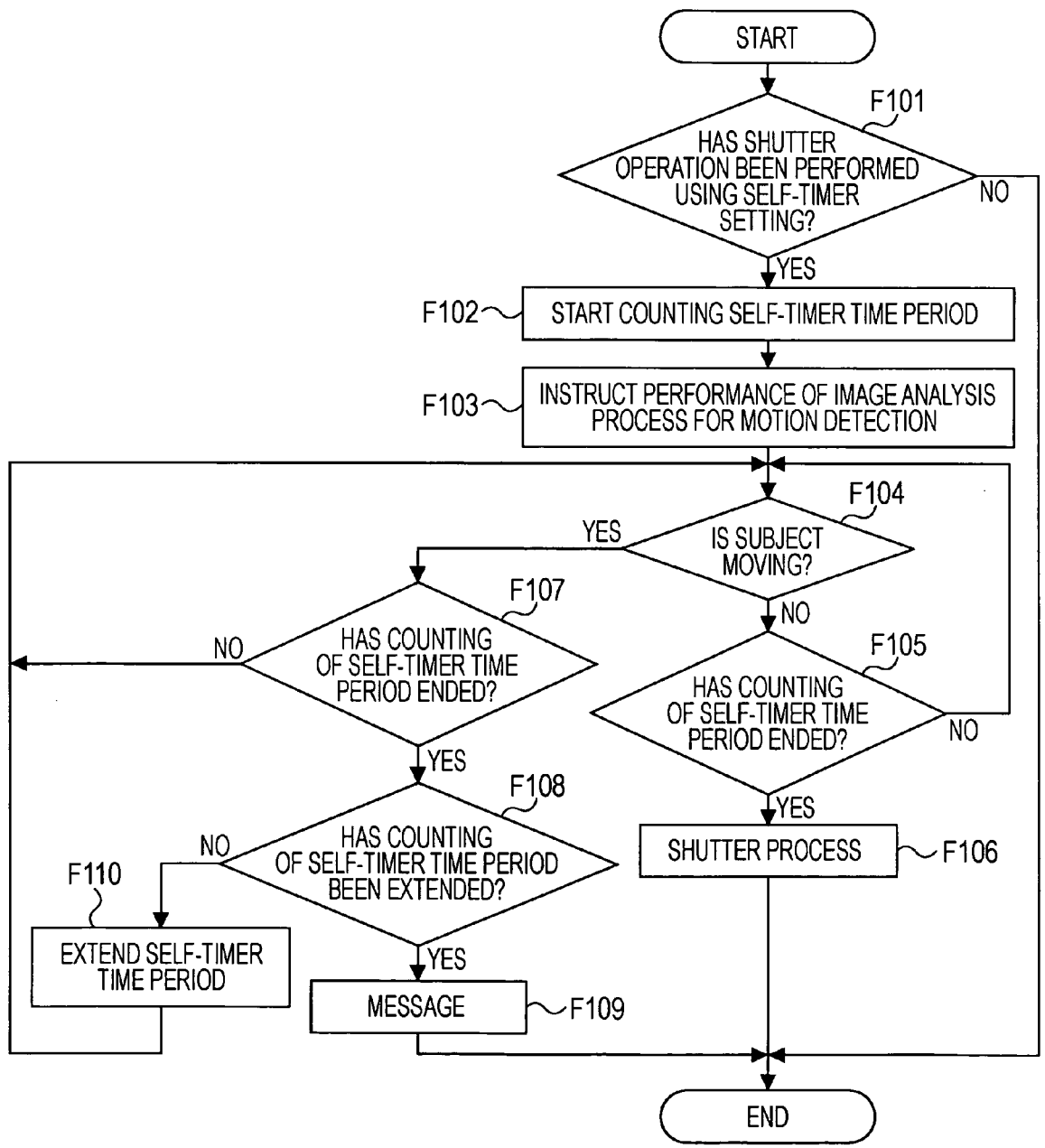
FIG. 2 is a flowchart of an image-capturing processing operation example I of the embodiment.

The processing shown in FIG. 2 is performed by the system controller 2 in accordance with a program stored in the built-in ROM (this applies the same for processing shown in FIGS. 3 to 8 (to be described later)).

Step F101 shows a process for monitoring a shutter operation using a self-timer function by the user. When a self-timer image-capturing operation for performing a shutter operation is performed by using a self-timer function by the user, the system controller 2 causes the process to proceed to step F102.

In step F102, in response to the self-timer image-capturing operation being performed by the user, the counting of a self-timer set time period is started. That is, the counting of, for example, 10 seconds, which is a time period from the time when the self-timer image-capturing operation is performed to the time when the shutter operation is performed, is started. Then, the process proceeds to step F103.

In step F103, it is instructed that an image analysis process for performing motion detection be started. That is, the image analysis unit 12 is made to perform image analysis on the captured image data received from the time at which counting of the self-timer set time period has started by the image-capturing unit 3. This image analysis is an image analysis process for performing motion detection and, for example, an average value or an integration value of luminance levels of the pixels is computed in units of frames. Then, the image analysis unit 12 supplies the image analysis result to the system controller 2.

On the basis of the result of the image analysis process, the system controller 2 performs a process for determining whether or not the subject is moving in step F104. For example, the computed average values or integration values of luminance levels in units of frames are compared, and when the luminance level has changed between consecutive frames, the subject is determined to be moving, and when the change in the luminance levels is slight or there is no change, the subject is determined to be stationary.

Then, when the subject is determined to be stationary, in step F105, a process for determining whether or not the self-timer set time period has ended is performed. When it is determined that the counting of, for example, 10 seconds, which is a self-timer set time period, has not ended, the process returns to step F104. When it is determined in step F104 that the subject is stationary, the processing of step F104→step F105→step F104 . . . is repeated until it is determined that the counting of the self-timer set time period has ended.

Then, when it is determined in step F105 that the counting of the self-timer set time period has ended at a certain time, a shutter operation is performed in step F106. That is, a process for storing the captured image data of one frame captured by the image-capturing unit 3 at the completion of the counting of the self-timer set time period in the storage unit 9 is performed. This captured image data captured at the completion of the counting of the self-timer set time period is captured image data captured when the subject was stationary. As a result, it is possible for the user to obtain a captured image as a still image in which the subject is not moving.

When it is determined in step F104 that the subject is moving, in step F107, a process for determining whether or not the counting of the self-timer set time period has ended. When it is determined in step F107 that the counting of the self-timer set time period has not ended, the process returns to step F104. Furthermore, when it is determined in step F104 that the subject is moving, processing of step F104→step F107→step F104 . . . is repeated until it is determined in step F107 that the counting of the self-timer set time period has ended. Then, when it is determined in step F107 that the counting of the self-timer set time period has ended at a certain time, in step F108, a process for determining whether or not the counting of the self-timer set time period has been extended is performed. That is, after the counting of the self-timer set time period, which started in step F102, has ended, a determination of whether or not the self-timer set time period has been extended is performed.

When it is determined in the process of step F108 that the counting of the self-timer set time period has not been extended, the process proceeds to step F110, where a process for extending the counting of the self-timer set time period is performed. For example, when the self-timer set time period is approximately 10 seconds, extension of the self-timer set time period, which is approximately 5 seconds, is performed.

As a result of extending the counting of the self-timer set time period, even when the motion of the subject does not cease within the time period of the original self-timer set time period, the provision of the extension time period increases the possibility that a captured image in which a motionless subject is captured is obtained.

For example, it is assumed that the counting of the self-timer set time period ends while the photographer who performs a self-timer image-capturing operation is moving to a place so that an image of the photographer himself/herself will be captured so that the photographer becomes a subject. In that case, as a result of providing an extension time period, a time margin can be provided, during which the photographer moves to a place where an image of the photographer is to be captured, and the possibility of obtaining a captured image in a state in which the subject is stationary increases.

Then, after a process for extending the counting of the self-timer set time period is performed in step F110, the process returns to step F104.

When it is determined in step F104 that the subject is stationary, the process proceeds to step F105. In step F105, this time, it is determined whether or not the counting in which the self-timer set time period has been extended has ended. When the counting has not ended, the process returns to step F104. When it is determined in step F104 that the subject is stationary, the processing of step F104→step F105→step F104 . . . is repeated until it is determined that the counting in which the self-timer set time period has been extended has ended.

Then, when it is determined in step F105 that the counting in which the self-timer set time period has been extended has ended at a certain time, a shutter operation is performed in step F106.

Furthermore, when it is determined in step F104 that the subject is moving, the process proceeds to step F107, where a determination is made as to whether or not the counting in which the self-timer set time period has been extended has ended. When it is determined in step F107 that the counting in which the self-timer set time period has been extended has not ended, the process returns to step F104. Then, when it is determined that the subject is moving, the processing of step F104→step F107→step F104 . . . is repeated until it is determined that the counting in which the self-timer set time period has been extended has ended.

Then, when it is determined in step F107 at a certain time that the counting in which the self-timer set time period has been extended has ended, in step F108, a process for determining whether or not the counting of the self-timer set time period has been extended is performed. At this point, when the process for extending the counting of the self-timer set time period has already been performed once in step F110, it is determined that the counting of the self-timer set time period has been extended, and the process proceeds to step F109.

In step F109, a process for outputting a message is performed. That is, since the self-timer set time period has been extended and even when the extension time period has ended, the subject is not still stationary. Therefore, in that case, a process for outputting a warning sound and a message by sound that image capturing cannot be performed because the subject is moving from the audio output unit 10 is performed.

For example, the warning sound may be sound that causes the user to recognize image-capturing failure. Alternatively, a message sound, such as "Was unable to capture image of subject because the subject was moving. Please perform the shutter operation again" may be output using synthesized sound, so that the user is made aware of the motion of the subject during image capturing.

Then, since the motion of the subject does not cease even when the extension time period of the self-timer set time period has ended, the system controller 2 stops the captured-image obtaining processing operation without performing the shutter operation performed in step F106.

Since the image-capturing processing operation example I of the embodiment described up to this point is performed, if the subject is stationary when the self-timer set time period passes, the image-capturing apparatus 1 performs a shutter operation at the completion of the self-timer set time period.

Furthermore, when the motion of the subject has been detected when the self-timer set time period passes, a process for extending the self-timer set time period is performed.

Furthermore, when the subject becomes stationary in the middle of the extension time period of the self-timer set time period, a shutter operation is performed at the completion of the extension time period of the self-timer set time period.

Furthermore, when the motion of the subject has been detected after the extension time period of the self-timer set time period passes, the captured-image obtaining processing operation is stopped without performing a shutter operation.

Usually, when a user sets the self-timer function and obtains a so-called "image-taken photograph", which is a captured image as a still image of one frame, in which an image of a subject is captured, it is possible to capture, for example, an image of the user who performed the self-timer image-capturing operation as a subject. However, when a subject is moving at the timing at which the shutter operation is performed after an elapse of the self-timer set time period, a so-called "failed photograph" in which the subject is blurred is obtained.

On the other hand, according to the above-described image-capturing processing operation example I, when the subject does not becomes stationary when the original self-timer set time period passes, the time period until when the shutter operation is performed is extended, making it possible to wait for the subject to become stationary during the extended time period. As a result, the possibility of being able to obtain an image-taken photograph desired by the user increases, and this becomes a process suitable for the user.

When the subject does not become stationary when the extension time period of the self-timer set time period passes, the counting of the self-timer set time period may be extended not only once but also a plurality of times.

Furthermore, when the counting of the self-timer set time period is extended in step F110, a message may be output by sound from the audio output unit 10. That is, the message may be sound that allows the user to recognize that the counting of the self-timer set time period has been extended.

For example, a message, such as "The self-timer set time period has been extended for 5 seconds", may be output by sound.

3. Image-Capturing Processing Operation Example II

In the captured-image obtaining processing operation of FIG. 2, in which the above-described optimum image obtaining function is implemented, when the self-timer function is set and an image of a subject is to be captured, a shutter operation is performed or a process for extending the self-timer set time period is performed on the basis of the result of the motion detection of the subject when the self-timer set time period passes.

As a result of performing the captured-image obtaining processing operation, obtaining of a failed photograph in which the subject is blurred is avoided, and the possibility of obtaining an image-taken photograph of the image quality desired by the user increases. In the captured-image obtaining processing operation of FIG. 2, for detecting blur of the subject, the motion of the entire subject is detected.

In general, in the image-capturing apparatus 1, when image capturing is to be performed by using a self-timer function, an image of a person is often captured, and it is considered that, in most cases, the user who performed the self-timer image-capturing operation is desired to be image-captured as a subject. That is, when image capturing is to be performed using a self-timer function, a priority of the user is that an image of a person is captured when the person is in an optimum state as a subject.

In the captured-image obtaining processing operation example of FIG. 2, the motion of the entire subject is detected. Even when a subject (a bird, a car, a plant, etc.) other than a person photographed in the background is moving, there is a possibility that the subject is recognized as moving. For example, there may be cases in which the image-capturing apparatus 1 determines that a subject is moving even in a state in which a person is stationary, such as, for example, when an automobile runs past the person or branches and leaves of trees and shrubs that are photographed together with the person are swinging due to wind.

As has been described above, when image capturing is to be performed using a self-timer function, in general, a user often wants an image of a person to be captured when the person is in his/her best state. Therefore, if only the motion of the person is detected in the subject, this becomes a process more suitable for the user.

Accordingly, when the motion of the subject is to be detected, a processing operation of detecting the motion of only the person is considered.

Such a captured-image obtaining processing operation will be described below.

Figure 3:
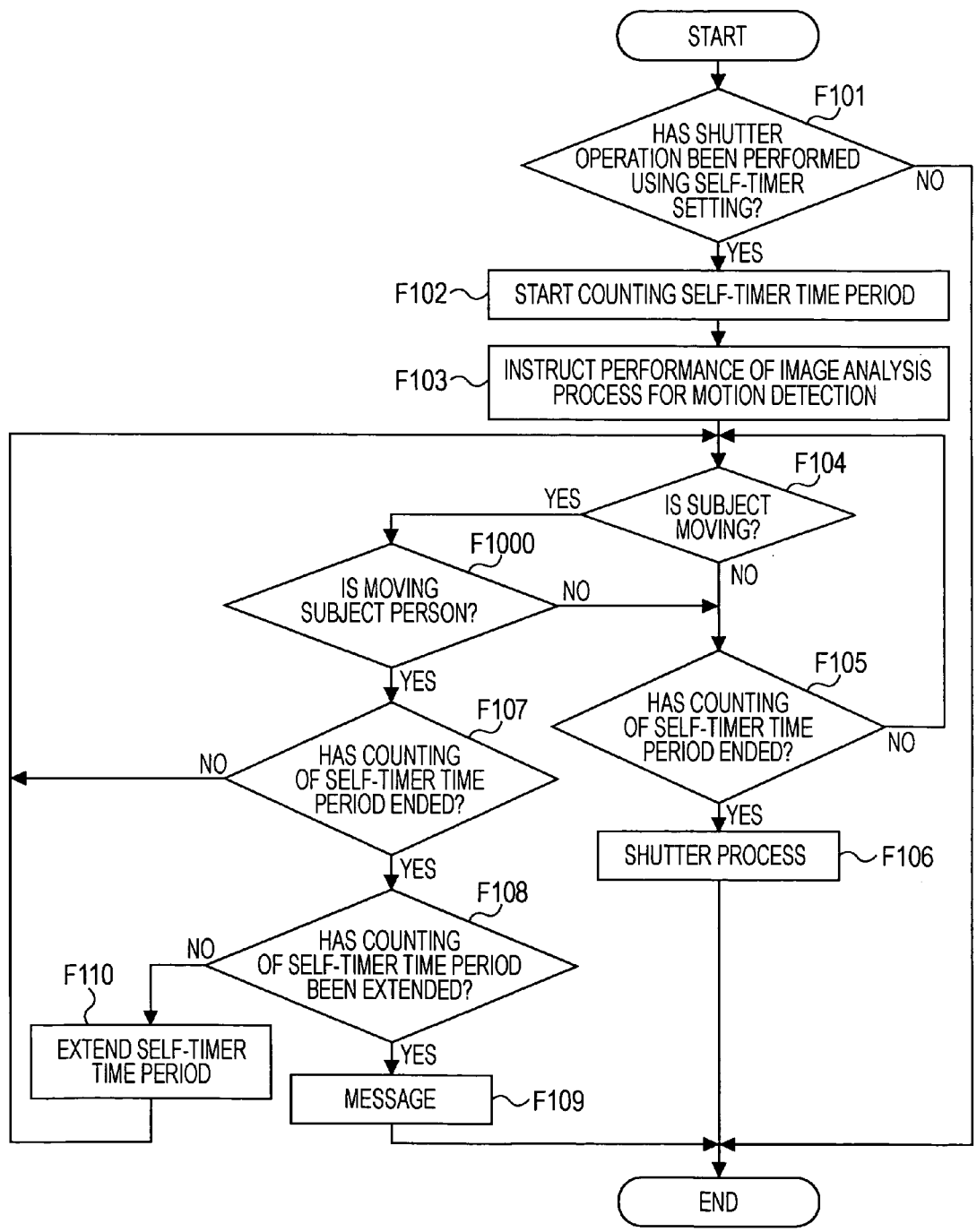
FIG. 3 is a flowchart of an image-capturing processing operation example II of the embodiment of the present invention.

FIG. 3 shows, in a flowchart, processing of the system controller 2 for implementing this operation.

Shown in FIG. 3 is a flowchart in which the process of step F1000 is added between step F104 and step F107 of the flowchart shown in FIG. 2. In the description of the flowchart of FIG. 3, steps for performing processing identical to those of the flowchart shown in FIG. 2 are designated with the same reference numerals, and descriptions thereof are omitted.

For the processing operation from step F101 to step F104 shown in FIG. 3, processing operations identical to the processing operations described with reference to FIG. 2 are performed. However, for the processing in step F103, in addition to the processing described with reference to FIG. 2, an image analysis process for identifying whether or not the subject is a person is performed.

Then, when it is determined in step F104 that the subject is not moving, the process proceeds to step F105. For the processing operations of step F105 and subsequent steps, processing operations identical to the processing operations described with reference to FIG. 2 are performed.

Furthermore, when it is determined in step F104 that the subject is moving, a process is performed in step F1000 for determining whether or not the moving subject is a person. That is, the captured image data is subjected to image analysis by the image analysis unit 12, and based on the analysis result, a determination is made as to whether or not the moving subject is a person.

For this reason, in the image analysis unit 12, image analysis is performed in which, for example, when parts (eye, nose, ear, mouth, etc.) of a face or parts (body contours, arms, palms of hands, legs, etc.), with which a determination of a person can be made, can be confirmed, the subject is determined to be a person.

When it is determined in step F1000 that the moving subject is a person, the process proceeds to step F107 shown in the figure. In step F107 and subsequent steps, processing operations identical to the processing operations described with reference to FIG. 2 are performed.

Furthermore, when it is determined in step F1000 that the moving subject is not a person, the process proceeds to step F105. That is, the determination result that the moving subject is not a person may be said to be a result identical to that in which a determination result that the subject is not moving is obtained and thus, the process proceeds to step F105.

Since the image-capturing processing operation example II that has been described thus far with reference to the flowchart of FIG. 3 is performed, if the motion of the person as a subject is stationary, the image-capturing apparatus 1 performs a shutter operation at the completion of the self-timer set time period.

Furthermore, if the motion of the person as a subject has been detected when the self-timer set time period passes, a process for extending the self-timer set time period is performed.

Furthermore, when the motion of the person as a subject becomes stationary during the extension time period of the self-timer set time period, the shutter operation is performed at the completion of the extension time period of the self-timer set time period.

Furthermore, if the motion of the person as a subject has been detected when the extension time period of the self-timer set time period has passed, the captured-image obtaining processing operation is stopped without performing the shutter operation.

As such a processing operation example, first, similarly to the image-capturing processing operation example I, when a photograph of an image of a subject is to be taken by setting a self-timer function, the self-timer set time period is extended if the motion of the subject is continued to be detected until the counting of the self-timer set time period ends. Then, as a result of the self-timer set time period being extended, the possibility of being able to obtain an image-taken photograph desired by the user increases, and this is a suitable process for the user.

Then, in the processing operation example, a determination of whether or not the moving subject is a person is made. For example, even if a subject other than a person, for example, an automobile or branches and leaves of trees and shrubs, is moving, the shutter operation can be performed by assuming that the subject is stationary when it is determined that the person is stationary. As a result, even when a subject other than a person is moving, since an image-taken photograph in a state in which the person is stationary can be obtained, this is a processing operation more suitable for the user.

4. Image-Capturing Processing Operation Example III

In the image-capturing processing operation examples I and II of FIGS. 2 and 3, which have been described thus far, a normal processing operation for performing image capturing using a self-timer function, in which a shutter operation is performed after the counting of the self-timer set time period has ended, has been performed.

When the subject whose image is to be captured in the normal processing operation is a person, it is assumed that the motion of the person becomes stationary, for example, immediately after the counting of the self-timer set time period is started. As the psychology of the person at this time, it is considered that the person wants that image capturing be quickly performed rather than being stationary at the same pose until the counting of the self-timer set time period ends.

Accordingly, when the subject becomes stationary even in the middle of the counting of the self-timer set time period, a captured-image obtaining processing operation for performing a shutter operation at that timing is considered.

Such a captured-image obtaining processing operation will be described below.

Figure 4:
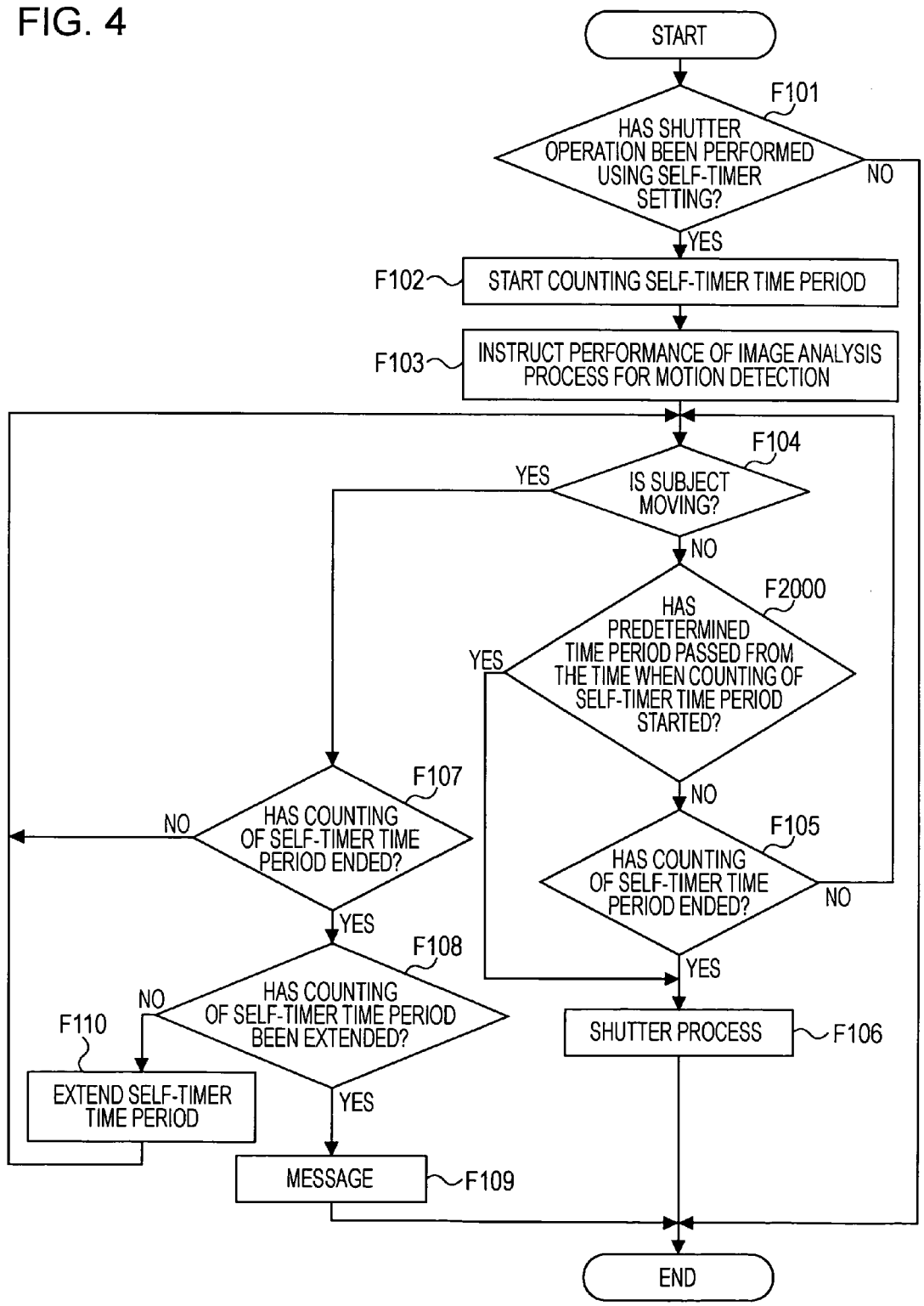
FIG. 4 is a flowchart of an image-capturing processing operation example III of the embodiment of the present invention.

FIG. 4 shows, in a flowchart, the processing of the system controller 2 for implementing this operation.

Shown in FIG. 4 is a flowchart in which the process of step F2000 is added between step F104 and step F105 in the flowchart shown in FIG. 2. In the description of the flowchart of FIG. 4, steps in which the same processing as for the flowchart shown in FIG. 2 is performed are designated with the same reference numerals, and descriptions thereof are omitted.

First, in the flowchart of FIG. 4, processing identical to that from step F101 to step F104 described with reference to FIG. 2 is performed. When it is determined in step F104 that the subject is not moving, a determination is made in step F2000 as to whether or not a predetermined time period has passed from the time when the counting of the self-timer set time period has started.

This predetermined time period is a time period in which a minimum time period is ensured until the shutter operation is performed by the self-timer function. For example, if the self-timer set time period is 10 seconds, this predetermined time period is set to 5 seconds, for instance. Then, as a result of providing the predetermined time period, it is possible to prevent a shutter operation from being performed when the user is not photographed as a subject, for example, in a case in which, after the user performs a self-timer image-capturing operation, the user himself/herself moves to an image-capturing place so as to become a subject.

When it is determined in step F2000 that the predetermined time period has not passed from the time when the counting of the self-timer set time period has started, the process proceeds to step F105.

For the processing operations of step F105 and subsequent steps, processing operations identical to the processing operations described with reference to FIG. 2 are performed.

Furthermore, when it is determined in step F2000 that the predetermined time period has passed from the time when the counting of the self-timer set time period has started, the process proceeds to step F106. That is, when it is determined that the predetermined time period has ended in a state in which the subject is stationary, this state is the same as the determination result of being a timing suitable to obtain a captured image. Therefore, the process proceeds to step F106, where the shutter operation is performed.

Furthermore, when it is determined in step F104 that the subject is moving, the process proceeds to step F107, and processing operations identical to the processing operations described with reference to FIG. 2 are performed.

That is, a process for determining whether or not the counting of the self-timer set time period has ended is performed. When the counting has not ended, the process returns to step F104. Then, when the counting has ended, a process for determining whether or not the self-timer set time period has been extended is performed. If the self-timer set time period has been extended, a process is performed for outputting, from the audio output unit 10, a warning sound or a message using sound to the effect that image capturing cannot be performed because the subject is moving, and the processing is stopped without performing the shutter operation performed in step F106.

At this point, when a process for extending the counting of the self-timer set time period is performed in step F110, a process for determining whether or not the subject is stationary is performed in step F104. Then, when it is determined that the subject is stationary, the process proceeds to step F2000. Since, naturally, the predetermined time period has already passed in step F2000, it is determined that the predetermined time period has passed from the time when the counting of the self-timer set time period has started. The process then proceeds to step F106, where the shutter operation is performed.

Since the image-capturing processing operation example III that has been described thus far with reference to the flowchart of FIG. 4 is performed, the image-capturing apparatus 1 performs a shutter operation when the motion of the subject ceases after an elapse of a predetermined time period from the start of the self-timer set time period. That is, even if the self-timer set time period has not passed, the shutter operation is performed when the motion of the subject ceases.

Furthermore, if the motion of the subject has been detected after the self-timer set time period has passed, a process for extending the self-timer set time period is performed.

Furthermore, the shutter operation is performed when the motion of the subject ceases during the extension time period of the self-timer set time period.

Furthermore, if the motion of the subject has been detected when the extension time period of the self-timer set time period ends, a captured-image obtaining processing operation is stopped without performing a shutter operation.

For such a processing operation example, first, advantages similar to those of the image-capturing processing operation example I are obtained. That is, if the motion of the subject is continued to be detected until the counting of the self-timer set time period has ended, the self-timer set time period is extended. As a result of providing this extension time period, the possibility that an image-taken photograph in which the subject is stationary can be obtained increases, and this is a process suitable for the user.

Furthermore, in this processing operation example, when the motion of the subject ceases during the self-timer set time period or when the motion of the subject ceases during the extension time period of the self-timer set time period, the shutter operation is performed without waiting for the counting to end. Therefore, when the subject is a person, it is possible to obtain an optimum image-taken photograph without forcing the person to maintain a stationary state.

In the captured-image obtaining processing operation described with reference to FIG. 4, the motion of the entire subject is detected. Step F1000 for performing a process for determining whether or not the moving subject described with reference to FIG. 3 is a person may be provided between step F104 and step F107 shown in FIG. 4. In that case, when it is determined in step F1000 that the moving subject is not a person, the system controller 2 causes the process to proceed to step F2000, and when it is determined that the moving subject is a person, the system controller 2 causes the process to proceed to step F107. Then, for the other processing, processing operations similar to the processing operations described with reference to FIG. 4 are performed.

In the captured-image obtaining processing operation when the flowcharts of FIGS. 3 and 4 are merged, advantages similar to those of the captured-image obtaining processing operation described with reference to FIGS. 3 and 4 can be obtained.

5. Image-Capturing Processing Operation Example IV

In the above-described image-capturing processing operation example III of FIG. 4, a description has been given of a captured-image obtaining processing operation in which, after an elapse of a predetermined time period from the time when the counting of the self-timer set time period has started or when the subject becomes stationary in the middle of the counting in which the self-timer set time period has been extended, a shutter operation is performed at the timing.

For the user, the self-timer set time period until the shutter operation is performed is an estimated period, but the extension time period of the self-timer set time period is a period that is not estimated. The user can have relaxed attitude in preparing for image capturing of himself/herself as a subject during the time period until the shutter operation is performed in the case of the estimated period. In the extension time period that is not estimated, it is difficult to estimate a period until the shutter operation is performed, and it is considered that the user desires that the shutter operation be performed earlier.

Accordingly, a captured-image obtaining processing operation is considered in which only when the subject becomes stationary in the middle of the counting in which the self-timer set time period has been extended, a shutter operation is performed at the timing.

Such a captured-image obtaining processing operation will be described below.

Figure 5:
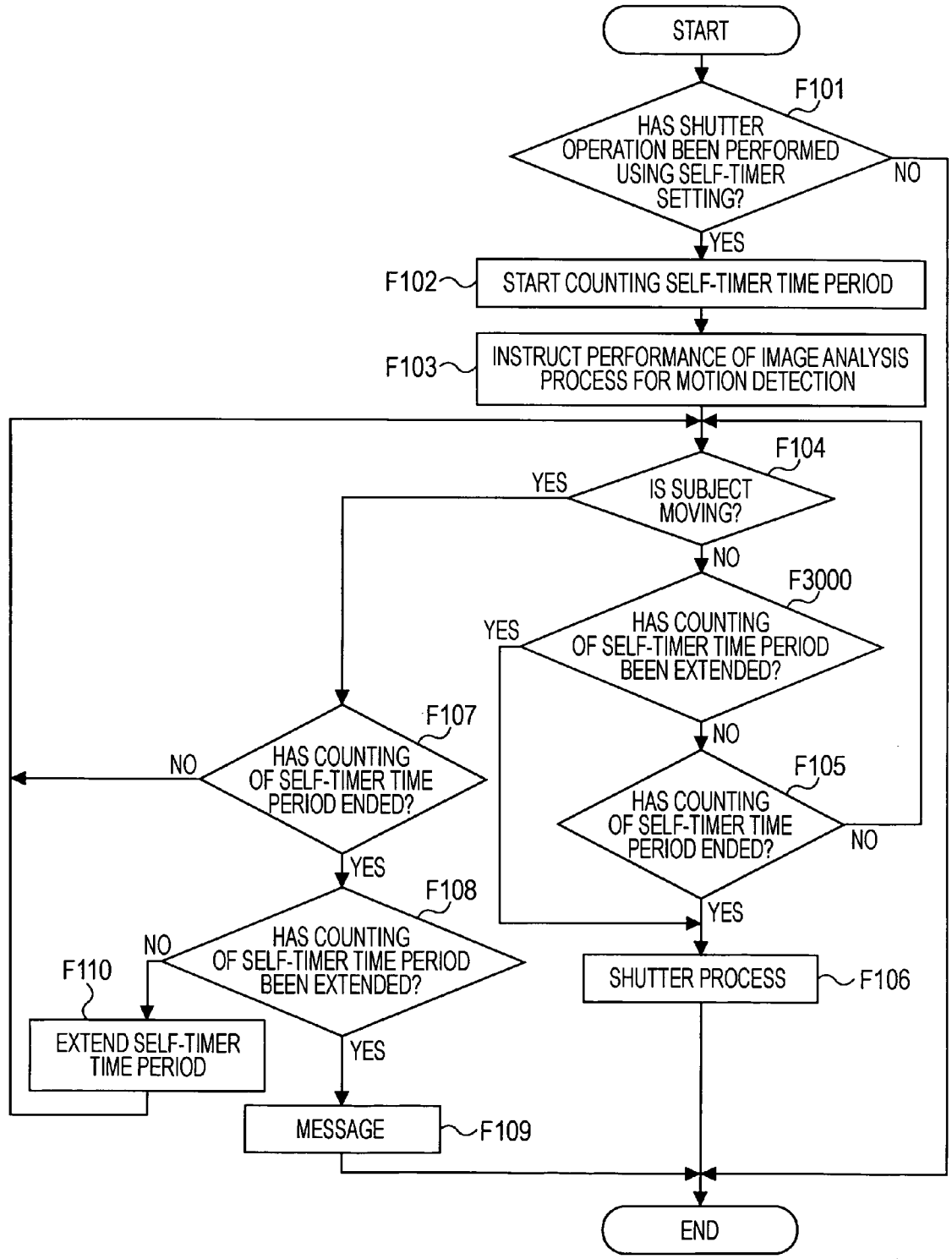
FIG. 5 is a flowchart of an image-capturing processing operation example IV of the embodiment of the present invention.

FIG. 5 shows, in a flowchart, processing of the system controller 2 for implementing this operation.

Shown in FIG. 5 is a flowchart in which the process of step F3000 is added between step F104 and step F105 of the flowchart shown in FIG. 2, that is, a flowchart in which the process of step F2000 of the flowchart shown in FIG. 4 is changed to the process of step F3000. Then, in the description of the flowchart of FIG. 5, steps for performing processing identical to that of the flowchart shown in FIG. 2 are designated with the same reference numerals, and descriptions thereof are omitted.

First, in the flowchart of FIG. 5, processing operations similar to the processing operations from step F101 to step F104 described with reference to FIG. 2 are performed. When it is determined in step F104 that the subject is not moving, a determination is made in step F3000 as to whether or not the counting of the self-timer set time period has been extended. At this point, when it is determined that the counting of the self-timer set time period has not been extended, the process proceeds to step F105. For the processing operations of step F105 and subsequent steps, similarly to the processing operations described with reference to FIG. 2, a process for determining whether or not the counting of the self-timer set time period has ended is performed. If the counting of the self-timer set time period has not ended, the process returns to step F104, and if it has ended, the process proceeds to step F106, where the shutter operation is performed.

Furthermore, when it is determined in step F104 that the subject is moving, the process proceeds to step F107 and hereafter, processing operations similar to the processing operations described with reference to FIG. 2 are performed. That is, a process for determining whether or not the counting of the self-timer set time period has ended is performed. If the counting of the self-timer set time period has not ended, the process returns to step F104. Furthermore, if the counting has ended, a process for determining whether or not the counting of the self-timer set time period has been extended is performed, and if the counting has not ended, a process for extending the counting of the self-timer set time period is performed. Then, when the counting has been extended, a process is performed for outputting, from the audio output unit 10, a warning sound or a message using sound to the effect that image capturing cannot be performed because the subject is moving.

Then, after the process for extending the counting of the self-timer set time period is performed in step F110, when it is determined in step F104 that the subject is not moving, a process for determining whether or not the counting of the self-timer set time period has been extended is performed in step F3000. This case means that the subject is in a stationary state during the extension time period of the counting, and this is a timing suitable to obtain a captured image. Therefore, the process proceeds from step F3000 to step F106, where the shutter operation is performed.

Since the image-capturing processing operation example IV that has been described thus far with reference to the flowchart of FIG. 5 is performed, if the subject is stationary, the image-capturing apparatus 1 performs a shutter operation at the completion of the self-timer set time period.

Furthermore, when the motion of the subject has been detected when the self-timer set time period ends, a process for extending the self-timer set time period is performed.

Furthermore, when the motion of the subject becomes stationary during the extension time period of the self-timer set time period, a shutter operation is performed.

Furthermore, if the motion of the subject has been detected when the extension time period of the self-timer set time period passes, the captured-image obtaining processing operation is stopped without performing the shutter operation.

Also, in the image-capturing processing operation example IV in which such processing operations are performed, first, advantages identical to those of the image-capturing processing operation example I can be obtained. That is, if the motion of the subject is continued to be detected until the counting of the self-timer set time period ends, the self-timer set time period is extended, and this increases the possibility of being able to obtain an image-taken photograph in which a subject is stationary. Thus, this becomes a process suitable for the user.

Then, in the image-capturing processing operation example IV, a shutter operation is newly performed at a timing at which the motion of the subject ceases before the counting in which self-timer set time period has been extended ends. Thus, when the subject is a person, it is possible to obtain an optimum image-taken photograph without imposing a psychological burden.

In the captured-image obtaining processing operation described with reference to FIG. 5, a case in which the motion of the entire subject is detected has been described. Alternatively, the motion of a person as a subject may be detected, as described with reference to FIG. 3.

In that case, step F1000 for performing a process for determining whether or not the moving subject shown in FIG. 3 is a person is provided between step F104 and step F107 shown in FIG. 5. Then, when it is determined in step F1000 that the moving subject is not a person, the system controller 2 causes the process to proceed to step F3000 and, when it is determined that the moving subject is a person, the system controller 2 causes the process to proceed to step F107. For the other processing, processing operations similar to the processing operations described with reference to FIG. 5 are performed.

In the captured-image obtaining processing operation in which the flowcharts of FIGS. 3 and 5 are merged, also, advantages identical to those of the captured-image obtaining, processing operation described with reference to FIGS. 3 and 5 can be obtained.

6. Image-Capturing Processing Operation Example V

Here, when an image of a subject is to be captured using the image-capturing apparatus 1, it is considered that, before a user performs a shutter operation, for example, an operation is performed via the operation input unit 7 in order to perform an appropriate exposure setting on a main subject.

In the case of the present invention, it is considered that exposure setting is performed before the user sets a self-timer function. However, during the self-timer set time period after such an exposure setting is performed, there is a possibility that the condition of light striking the subject suddenly changes. Examples thereof include cases in which, when image capturing is performed outdoors, the sun suddenly appears from behind the clouds, or conversely the sun becomes hidden behind the clouds, thereby changing the light conditions.

Accordingly, a processing operation of automatically performing correction of exposure setting is considered in order to cope with a case in which the condition of light striking the subject suddenly changes during the counting of the self-timer set time period after the user performs exposure setting before a self-timer image-capturing operation is performed.

Such a captured-image obtaining processing operation will be described below.

Figure 6:
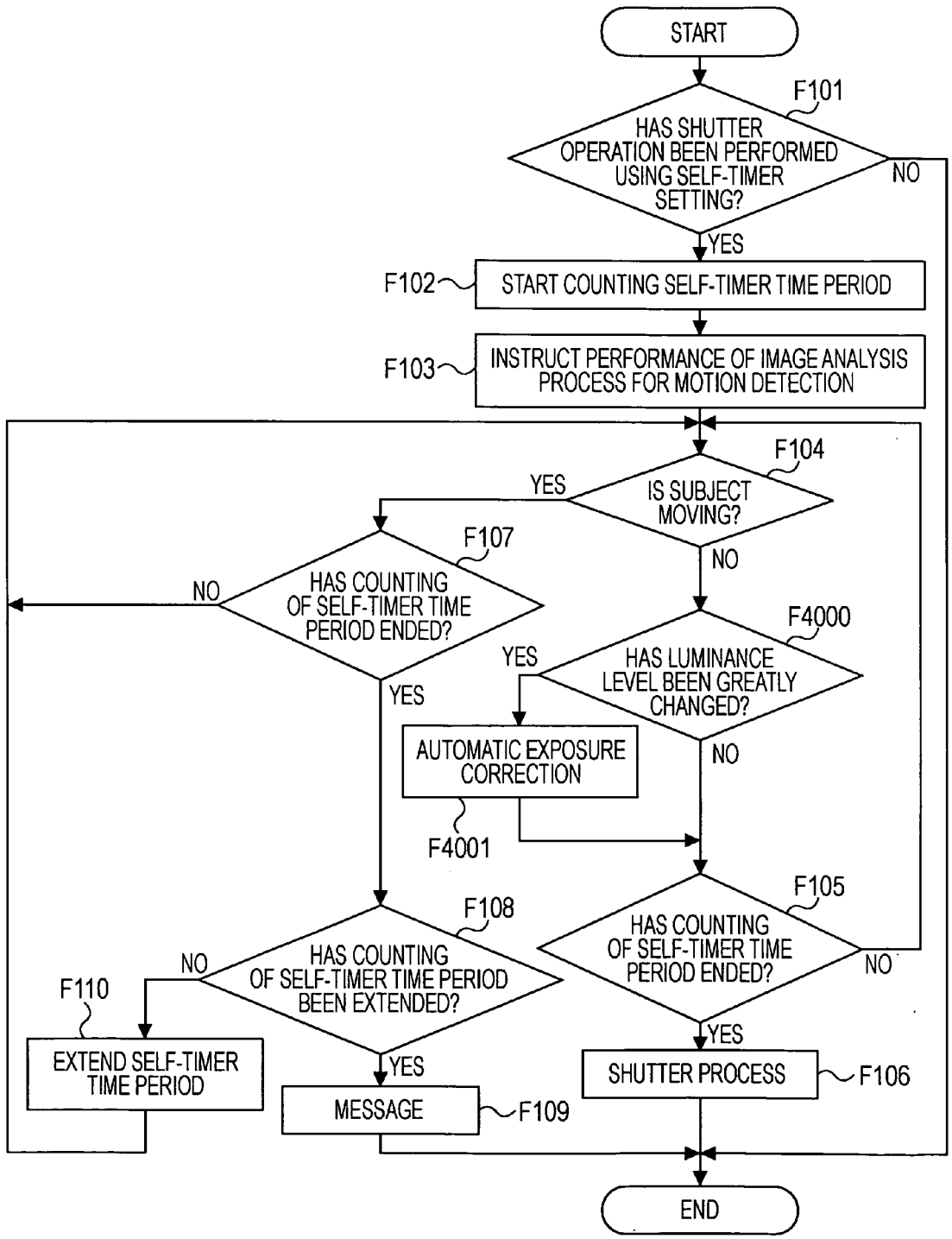
FIG. 6 is a flowchart of an image-capturing processing operation example V of the embodiment of the present invention.

FIG. 6 shows, in a flowchart, processing of the system controller 2 for implementing this operation.

The flowchart shown in FIG. 6 is a flowchart in which the processes of step F4000 and step F4001 are added between step F104 and step F105 of the flowchart shown in FIG. 2. In the description of the flowchart of FIG. 6, steps for performing processes identical to those of the flowchart shown in FIG. 2 are designated with the same reference numerals, and descriptions thereof are omitted.

At first, from step F101 to step F104, processing operations identical to the processing operations described with reference to FIG. 2 are performed. Then, when it is determined in step F104 that the subject is not moving, a process is performed in step F4000 for determining whether or not the luminance level has greatly changed.

The great change in the luminance levels, referred to herein, is a change in the luminance to such a degree that exposure correction is necessary. That is, when the luminance level changes from the exposure setting set by the user and a predetermined threshold value of the change in the luminance level is exceeded, exposure correction is necessary so as to approach the value of the exposure setting set by the user. This situation is mentioned as a great change in the luminance levels.

For example, there is a case in which the sun suddenly appears from the clouds, and the condition of light striking the subject changes, thereby causing the luminance level to be greatly changed and necessitating correction of exposure setting.

Then, when it is determined in step F4000 that there is no great change in the luminance levels, the process proceeds to step F105 and hereafter, processing operations identical to the processing operation described with reference to FIG. 2 are performed.

Furthermore, when it is determined that there is a great change in the luminance levels, processing operation of automatic exposure correction is performed in step F4001.

In step F4001, control of changing the value of the amount of aperture opening is performed in the image-capturing optical system 3a so as to approach the exposure setting performed by the user at first. In the image-capturing element unit 3b, control of changing the shutter speed is performed to change the exposure time period. In the image-capturing signal processor 3c, control of changing the value of the setting of the PGA gain is performed.

Depending on the degree of the change in the luminance levels, control of all the three parameters of the above-described settings of the aperture, the exposure time period, and the PGA gain may be performed, or control of one or two parameters may be performed.

When the correction of the changed exposure is completed in step F4001, the process proceeds to step F105.

Furthermore, when it is determined in step F104 that the subject is moving, the process proceeds to step F107 and hereafter, processing operations identical to the processing operations described with reference to FIG. 2 are performed.

The image-capturing processing operation example V of FIG. 6, which has been described thus far, has been performed. Thus, in the image-capturing apparatus 1, exposure correction is automatically performed when the luminance level is greatly changed after the motion of the subject ceases during the self-timer set time period, and a shutter operation is performed at the completion of the self-timer set time period.

Furthermore, when the motion of the subject has been detected when the self-timer set time period has passed, a process for extending the self-timer set time period is performed.

Furthermore, after the motion of the subject ceases during the extension of the self-timer set time period, when the luminance level is greatly changed, exposure correction is automatically performed, and a shutter operation is performed at the completion of the extension time period of the self-timer set time period.

Furthermore, when the motion of the subject has been detected when the extension time period of the self-timer set time period has passed, the captured-image obtaining processing operation is stopped without performing the shutter operation.

In such an image-capturing processing operation example V, also, advantages identical to those of the image-capturing processing operation example I can be obtained. That is, since the self-timer set time period can be extended depending on the result of the motion detection of the subject after the self-timer set time period has passed, the possibility of being able to obtain an image-taken photograph desired by the user increases, and this is a process suitable for the user.

Furthermore, in this processing example, exposure correction is automatically performed even if the image-capturing environment is suddenly changed during the self-timer set time period and the luminance level is greatly changed to such a degree that exposure correction is necessary. Therefore, it is not necessary for the user to perform setting of the changed exposure again, and this may be said to be a suitable processing operation to obtain an image-taken photograph of optimum image quality.

The flowchart for the captured-image obtaining processing operation that has been described with reference to FIG. 6 may be provided with step F1000, which is described with reference to FIG. 3, for performing a process for determining whether or not the subject is a person, and step F2000, which is described with reference to FIG. 4, for performing a process for determining whether or not a predetermined time period has ended from the time when the counting of the self-timer set time period has started.

In that case, step F1000 is provided between step F104 and step F107, and step F2000 is provided between step F4000 and step F105.

Then, when it is determined in step F1000 that the moving subject is not a person, the system controller 2 causes the process to proceed to step F4000. When it is determined that the moving subject is a person, the system controller 2 causes the process to proceed to step F107.

Furthermore, when it is determined in step F4000 that the luminance level has not been greatly changed, the process proceeds to step F2000. Furthermore, when it is determined that the luminance level has been greatly changed, a processing operation of automatic exposure correction is performed in step F4001 and thereafter, the process proceeds to step F2000.

In step F2000, when it is determined that the predetermined time period has not ended from the time when the counting of the self-timer set time period has started, the process proceeds to step F105, and when it is determined that the predetermined time period has ended from the time when the counting of the self-timer set time period has started, the process proceeds to step F106. For the other processing, processing operations identical to the processing operation described with reference to FIGS. 3, 4, and 6 are performed.

In the processing operation in which the above-described processing operations of FIGS. 3, 4, and 6 are merged, in place of step F2000 described with reference to FIG. 4, step F3000, which is described with reference to FIG. 5, for performing a process for determining whether or not the counting of the self-timer set time period has been extended may be provided.

In that case, when it is determined that the counting of the self-timer set time period has not been extended, the process proceeds to step F105, and when it is determined that the counting of the self-timer set time period has been extended, the process proceeds to step F106. For the other processing, processing operations identical to the processing operations described with reference to FIGS. 3, 5, and 6 are performed.

Furthermore, it is also possible to perform processing operations in which processing operations of FIGS. 3 and 6, FIGS. 4 and 6, and FIGS. 5 and 6 are merged. The processing operation in which the processing operations of FIGS. 3 and 6 are merged is a processing operation in which the processing operation of step F2000 of FIG. 4 is excluded from the processing operation in which the above-described processing operations of FIGS. 3, 4, and 6 are merged. Furthermore, the processing operation in which the processing operations of FIGS. 4 and 6 are merged is a processing operation in which the processing operation of step F1000 of FIG. 3 is excluded from the processing operations in which the above-described processing operations of FIGS. 3, 4, and 6 are merged. Then, the processing operation in which the processing operations of FIGS. 5 and 6 are merged is a processing operation in which the processing operation of step F1000 of FIG. 3 is excluded from the processing operation in which the processing operations of FIGS. 3, 5, and 6 are merged.

In these captured-image obtaining processing operations, also, advantages identical to those of the captured-image obtaining processing operations of FIGS. 3, 4, 5, and 6 can be obtained.

7. Image-Capturing Processing Operation Example VI

Here, in the image image-capturing obtaining processing operations I, II, III, IV, and V described thus far, when an image of a subject is to be captured by using a self-timer function in the image-capturing apparatus 1, processing operations for detecting the motion of the subject and obtaining an image-taken photograph of optimum image quality on the basis of detection result have been performed.

Furthermore, in the image-capturing apparatus 1, in order to obtain an image-taken photograph of the optimum image quality, it is considered to not only perform a processing operation on the basis of the detection result of the motion of the subject, but also detect the motion of the image-capturing apparatus 1 and perform a processing operation on the basis of the detection result.

For example, when image capturing is to be performed with a tripod being mounted in the image-capturing apparatus 1, there is a possibility that, during the self-timer set time period, vibration occurs in the place where the tripod is disposed and the image-capturing apparatus 1 may be inclined, and in the case of an open air, the tripod may fall due to the influence of wind. As described above, if a shutter operation is performed in a state in which the image-capturing apparatus 1 is inclined or has fallen, an image-taken photograph desired by the user may not be obtained.

Accordingly, after the counting of the self-timer set time period has started, when the image-capturing apparatus 1 has moved, a processing operation for stopping the image capturing of the image-capturing apparatus 1 is considered.

Such a captured-image obtaining processing operation will be described below.

Figure 7:
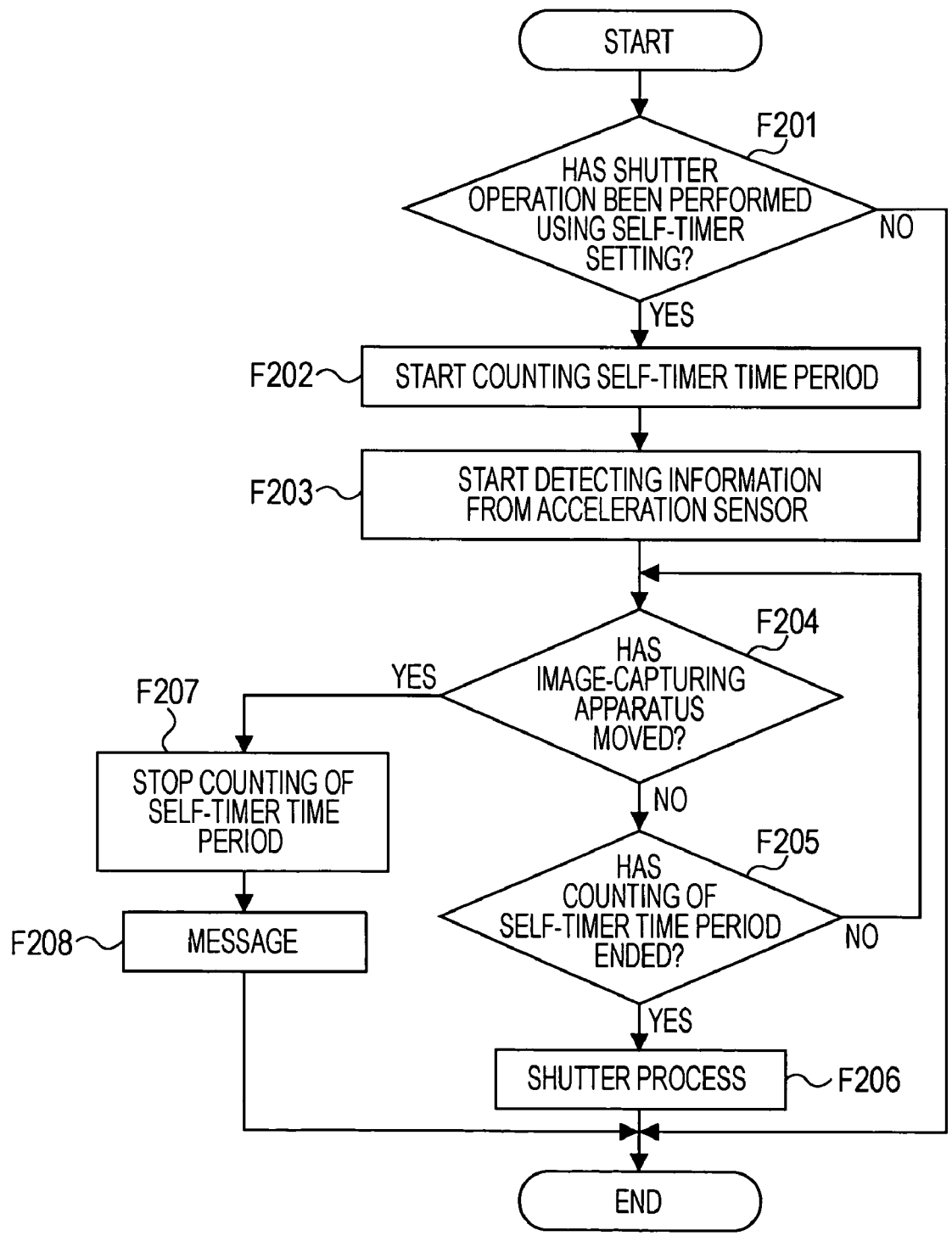
FIG. 7 is a flowchart of an image-capturing processing operation example VI of the embodiment of the present invention.

FIG. 7 shows, in a flowchart, processing of the system controller 2 for implementing this operation.

In FIG. 7, for the processing from step F201 to step F202, processing, which is identical to the processing from step F101 to step F102 described with reference to FIG. 2, is performed. That is, when the setting of the self-timer function is performed by the user, a process for starting the counting of the self-timer set time period is performed.

In step F203, a process for starting to detect information from the acceleration sensor 8 is performed, and the process then proceeds to step F204. In step F204, a determination of whether or not the image-capturing apparatus 1 has moved is made on the basis of the information from the acceleration sensor 8. When it is determined that the image-capturing apparatus 1 is not moving, the process proceeds to step F205. Then, for the processes of step F205 and step F206, processing identical to the processes of step F105 and step F106, which are described with reference to FIG. 2, is performed. That is, when it is determined that the counting of the self-timer set time period has ended, a process is performed for storing a captured image data of one frame, which is captured by the image-capturing unit 3, in the storage unit 9 at the completion of the counting of the self-timer set time period. Furthermore, when it is determined that the counting of the self-timer set time period has not ended, the process returns to step F204. Then, when it is determined that the image-capturing apparatus 1 is not moving, the image-capturing apparatus 1 repeats the processing of step F204→step F205→step F204 . . . until it is determined in step F205 that the counting of the self-timer set time period has ended.

Furthermore, when it is determined in step F204 that the image-capturing apparatus 1 is moving on the basis of the information from the acceleration sensor 8, a process for stopping the counting of the self-timer set time period is performed in step F207. This is because if the image-capturing apparatus 1 is inclined or is directed toward a direction differing from the direction determined by the user at first, an image-taken photograph of the composition intended by the user cannot be obtained, and even if the shutter operation is performed as it is, since an image-taken photograph of optimum image quality cannot be obtained, the shutter operation is stopped.

After the process for stopping the counting of the self-timer set time period is performed, a process is performed in step F208 for outputting a message. That is, a warning sound informing the user of the fact that the image-capturing apparatus 1 is inclined or has fallen, and a message to that effect are output using synthesized sound from the audio output unit 10.

For example, a message sound, such as "The posture of the image-capturing apparatus has changed. The shutter operation has been stopped", may be output.

Then, as a result of the image-capturing apparatus 1 being moved, the system controller 2 stops the captured-image obtaining processing operation without performing the shutter operation performed in step F106.

As a technique for detecting the motion of the image-capturing apparatus 1, the motion of the image-capturing apparatus 1 can be determined on the basis of not only the information from the acceleration sensor 8, but also the information from the image analysis unit 12. That is, when there is a change in the field angle of the captured image data on the basis of the information from the image analysis unit 12, the system controller 2 may assume that the posture of the image-capturing apparatus 1 has changed from the original posture and may determine that the image-capturing apparatus 1 has moved.

Since the image-capturing processing operation example VI that has been described thus far with reference to the flowchart shown in FIG. 7 is performed, if the image-capturing apparatus 1 is stationary, the image-capturing apparatus 1 performs a shutter operation at the completion of the self-timer set time period.

Furthermore, when the image-capturing apparatus 1 has moved during the self-timer set time period, a process for stopping the shutter operation is performed.

According to such an image-capturing processing operation example VI, when the motion of the image-capturing apparatus 1 is detected, the shutter operation is stopped. Thus, it is possible to avoid obtainment of an image-taken photograph as a so-called "failed photograph" of a field angle that is not a field angle intended to be set by the user at first because the image-capturing apparatus 1 is inclined or has fallen. As a result, it does not occur that an image-taken photograph as a failed photograph, which is not desired by the user, is useless obtained, and this may be said to be a process suitable for the user.

8. Image-Capturing Processing Operation Example VII

Here, a captured-image obtaining processing operation is also considered in which a technique, described in the image-capturing processing operation examples I, II, III, IV, and V among the above-described captured-image obtaining processing operations, for detecting the motion of a subject or a person as a subject and controlling the shutter operation, and a technique, described in the image-capturing processing operation example VI, for detecting the motion of the image-capturing apparatus 1 and controlling the shutter operation are merged.

Such a captured-image obtaining processing operation will be described below.

Figure 8:
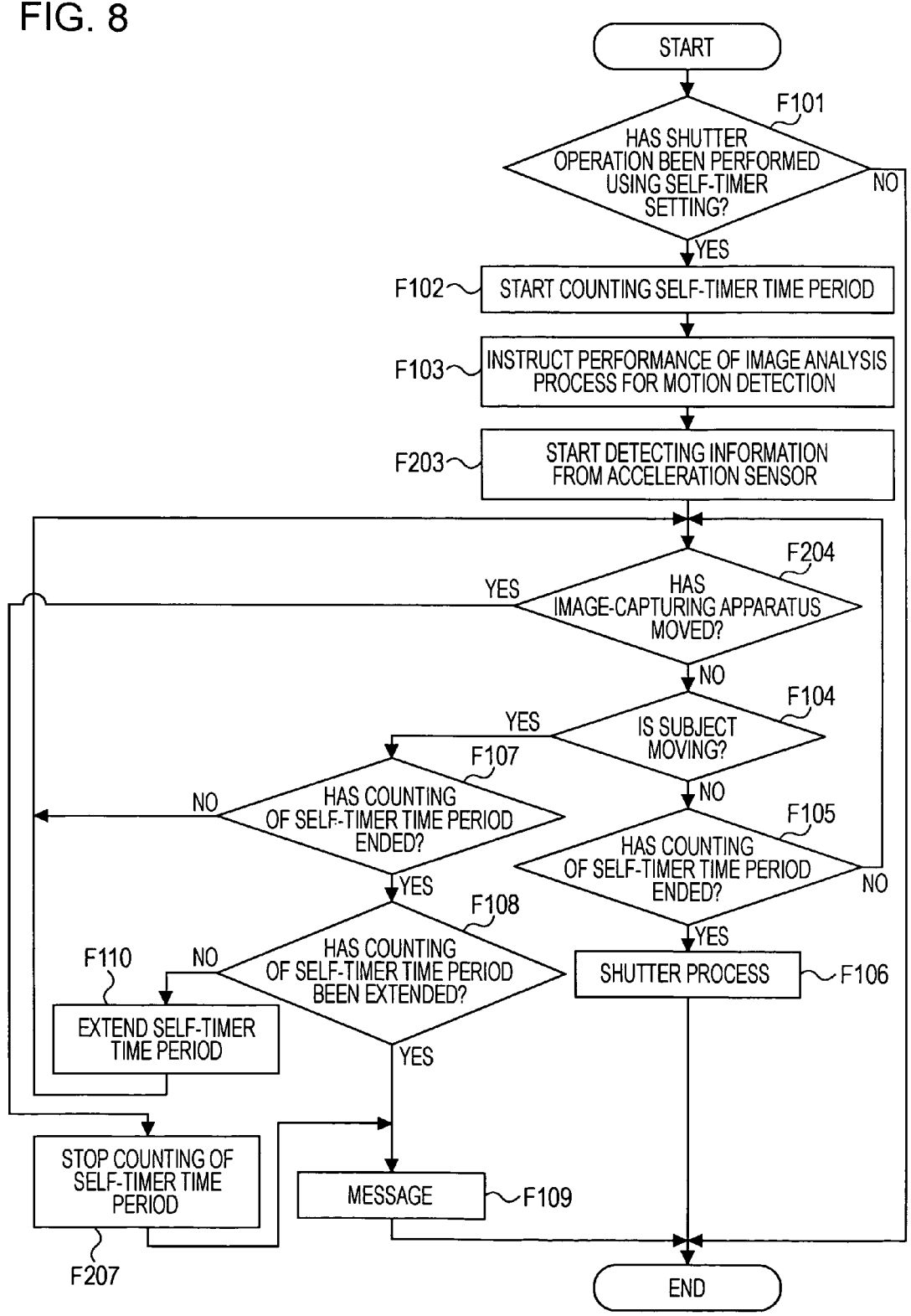
FIG. 8 is a flowchart of an image-capturing processing operation example VII of the embodiment of the present invention.

A flowchart shown in FIG. 8 shows a processing operation in which the processing operation described with reference to FIG. 2 and the processing operation described with reference to FIG. 7 are merged. That is, in the flowchart of FIG. 8, step F203 and step F204 described with reference to FIG. 7 are provided between step F103 and step F104 described with reference to FIG. 2. Furthermore, step F207 described with reference to FIG. 7 is provided between step F204 and step F109 described with reference to FIG. 2.

Furthermore, for each of the steps of the flowchart shown in FIG. 8, the same process as that of each step shown in FIGS. 2 and 7 is performed. Accordingly, the steps of the flowchart shown in FIG. 8 are designated with the same reference numerals, and descriptions thereof are omitted.

First, the system controller 2 performs processing identical to the processing from step F101 to step F103, which is described with reference to FIG. 2. That is, a determination of whether or not a self-timer image-capturing operation has been performed is performed. When it is determined that the self-timer image-capturing operation has been performed, the counting of the self-timer set time period is started. Then, an instruction is issued to cause the image analysis unit 12 to perform image analysis of the captured image data received by the image-capturing unit 3, and the process then proceeds to step F203.

In step F203 and step F204, processing identical to the processing described with reference to FIG. 7 is performed. That is, detection of information from the acceleration sensor 8 is started, and a determination of whether or not the image-capturing apparatus 1 is moving is made. Then, when it is determined that the image-capturing apparatus 1 is moving, an image-taken photograph of the composition intended by the user cannot be obtained because the image-capturing apparatus 1 has moved. Therefore, in step F207, a process for stopping the counting of the self-timer set time period is performed, and the shutter operation is stopped. Furthermore, the process proceeds to step F109, where a warning sound informing that the image-capturing apparatus 1 is inclined or has fallen and a message sound, such as "The posture of the image-capturing apparatus has changed. The shutter operation has been stopped", are output from the audio output unit 10.

Furthermore, when it is determined that the image-capturing apparatus 1 is not moving, the process proceeds to step F104, where a process for determining whether or not the subject is moving is performed on the basis of the image analysis result in the image analysis unit 12.

When it is determined that the subject is not moving, the process proceeds to step F105. When the self-timer set time period has ended, a shutter operation is performed in step F106, and when the self-timer set time period has not ended, the process returns to step F204.

Then, when it is determined that the subject is moving, the process proceeds to step F107, and when it is determined that the self-timer set time period has not ended, the process returns to step F204. Furthermore, when it is determined that the self-timer set time period has ended, the process proceeds to step F108, where a process for determining whether or not the self-timer set time period has been extended is performed.

When it is determined in step F108 that the self-timer set time period has not been extended, the self-timer set time period is, for example, approximately 10 seconds, an extension of the self-timer set time period of approximately 5 seconds is performed in step F110. As a result of providing this extension time period, the possibility of obtaining a captured image of a subject whose motion is stationary increases.

Then, the process returns to step F204, where when it is determined that the image-capturing apparatus 1 was not moving and the subject is also not moving, the process proceeds to step F105. In step F105, this time, a determination of whether or not the counting in which the self-timer set time period has been extended has ended is performed. When it is determined that the extended counting has ended, the process proceeds to step F106, and when it is determined that the extended counting has not ended, the process returns to step F204.

When it is determined in step F108 that the self-timer set time period has been extended, the process proceeds to step F109. In this case, in step F109, a warning sound that causes the user to recognize image-capturing failure, and a message sound, such as "Image capturing could not be performed because the subject whose image is to be captured was moving. Please perform the shutter operation again", is output from the audio output unit 10.

Since the image-capturing processing operation example VII that has been described thus far with reference to the flowchart of FIG. 8 is performed, if the motion of the image-capturing apparatus 1 and the subject are stationary, the image-capturing apparatus 1 performs the shutter operation at the completion of the self-timer set time period.

Furthermore, when the image-capturing apparatus 1 has moved during the self-timer set time period, a process for stopping the shutter operation is performed.

Furthermore, when the image-capturing apparatus 1 is stationary when the self-timer set time period passes and the motion of the subject has been detected, a process for extending the self-timer set time period is performed.

Furthermore, when the motion of the image-capturing apparatus 1 and that of the subject cease during the extension time period of the self-timer set time period, the shutter operation is performed at the completion of the extension time period of the self-timer set time period.

Furthermore, when the image-capturing apparatus 1 is stationary when the extension time period of the self-timer set time period passes and the motion of the subject has been detected, the captured-image obtaining processing operation is stopped without performing the shutter operation.

According to such an image-capturing processing operation example VII, a processing operation capable of obtaining an optimum image-taken photograph on the basis of the motion of the subject, and a processing operation capable of avoiding obtainment of an image-taken photograph as a failed photograph on the basis of the motion of the image-capturing apparatus 1 are merged, thereby obtaining a more optimum image-taken photograph. Therefore, this may be said to be a process suitable for the user.

In addition to the processing operation in which the captured-image obtaining processing operations of FIGS. 2 and 7 are merged, which is described with reference to FIG. 8, processing operations in which FIGS. 3 and 7, FIGS. 4 and 7, FIGS. 5 and 7, and FIGS. 6 and 7 are merged are considered. Furthermore, processing operations in which combinations of FIGS. 3, 4, and 7, of FIGS. 3, 5, and 7, of FIGS. 3, 6, and 7, of FIGS. 4, 6, and 7, of FIGS. 5, 6, and 7, of FIGS. 3, 4, 6, and 7, and of FIGS. 3, 5, 6, and 7 are merged are also considered.

Even in the case of the captured-image obtaining processing operation of any of these combinations, advantages identical to those of the captured-image obtaining processing operations described with reference to FIGS. 2, 3, 4, 5, 6, and 7 can be obtained.

9. Modification

The embodiments of the present invention have been described thus far. However, the present invention should not be limited to the embodiments that have been described thus far.

For example, the optimum image obtaining function that has been described thus far may be such that function-on/function-off is set in response to a mode operation by the user as desired. By setting off the optimum image obtaining function, for example, when the user who is a photographer wants to intentionally take an image-taken photograph in which the subject is moving by using a self timer, it is preferable if a mode operation is performed using the operation input unit 7 so as to be capable of turning off the optimum image obtaining function as described as in the above-described processing examples.

Furthermore, in the above-described examples, warning output is performed by audio output from the audio output unit 10. Alternatively, a warning may be issued by light-emitting output using a light-emitting element, such as an LED. Furthermore, message display may be performed on the display unit 5. Furthermore, a processing example in which warning output is not performed is considered.

Furthermore, in response to the shutter operation, a process for storing the captured image data of one frame, as a captured image as a still image, in the storage unit 9 is performed. In addition, for the storage process, the captured image data may also be transmitted to an external device. That is, a transmitter for an external device may be provided, and an operation for transmitting captured image data and storing it in the external device is included in the storage process referred to in the present invention.

Furthermore, in the captured-image obtaining processing operations that have been thus far, if conditions for performing a shutter operation are met, a time period until the shutter operation is performed in practice may be informed to the user by, for example, light-emitting output using a light-emitting element, such as an LED.

For example, when the self-timer set time period is approximately 10 seconds, the timing at which the shutter operation is performed may be informed to the user by causing a light-emitting element to blink approximately 3 seconds before the shutter operation is performed.

Furthermore, after the light-emitting element begins to blink, the motion of the subject may be detected, or even if the image-capturing apparatus 1 has moved, the shutter operation may be performed.

It should be understood by those skilled in the art that various modifications, combinations, sub-combinations and alterations may occur depending on design requirements and other factors insofar as they are within the scope of the appended claims or the equivalents thereof.

What is claimed is:

1. An image-capturing apparatus comprising:
   image-capturing means for capturing an image of a subject in order to obtain captured image data;
   storage processing means for performing a process for storing the captured image data obtained by the image-capturing means;
   operation means for performing a self-timer image-capturing operation;
   motion detection means for detecting motion of the subject;
   control means for, when the self-timer image-capturing operation is performed using the operation means, controlling, on the basis of detection information obtained by the motion detection means, a shutter operation in which the captured image data obtained by the image-capturing means is stored by the storage processing means after a self-timer set time period passes;
   wherein:
   the motion detection means detects the motion of the subject by performing image analysis of the captured image data obtained by the image-capturing means, the motion detection means detecting the motion of a person as the subject,
   the control means controls the shutter operation on the basis of the detection information on the motion of the person by the motion detection means, and on the basis of the detection information obtained by the motion detection means, the control means performs a process for extending the self-timer set time period when the person is moving when the self-timer set time period passes.

2. The image-capturing apparatus according to claim 1, wherein the motion detection means further detects the motion of the image-capturing apparatus.

3. The image-capturing apparatus according to claim 2, wherein, in the motion detection means, the motion of the image-capturing apparatus is detected by using a sensor for detecting the motion of the image-capturing apparatus.

4. The image-capturing apparatus according to claim 2, wherein, in the motion detection means, the motion of the image-capturing apparatus is detected by performing image analysis of the captured image data obtained by the image-capturing means.

5. The image-capturing apparatus according to claim 1, wherein, on the basis of the detection information obtained by the motion detection means, the control means further performs control for stopping the shutter operation when the subject is moving when an extension time period of the self-timer set time period passes.

6. The image-capturing apparatus according to claim 1, wherein, on the basis of the detection information obtained by the motion detection means, the control means performs control for stopping the shutter operation when the person is moving after an extension time period of the self-timer set time period passes.

7. The image-capturing apparatus according to claim 1, further comprising message output means,
wherein, on the basis of the detection information obtained by the motion detection means, the control means performs control for causing the message output means to output a message when the subject is moving when an extension time period of the self-timer set time period passes.

8. The image-capturing apparatus according to claim 1, wherein, on the basis of the detection information obtained by the motion detection means, the control means performs control so that the shutter operation is performed when detection information indicating that the subject is stationary is obtained before the self-timer set time period passes.

9. The image-capturing apparatus according to claim 2, wherein, on the basis of the detection information obtained by the motion detection means, the control means performs control for stopping the shutter operation when detection information indicating that the image-capturing apparatus has moved during the self-timer set time period is obtained.

10. An image-capturing apparatus comprising:
image-capturing means for capturing an image of a subject in order to obtain captured image data;
storage processing means for performing a process for storing the captured image data obtained by the image-capturing means;
operation means for performing a self-timer image-capturing operation;
motion detection means for detecting motion;
control means for, when the self-timer image-capturing operation is performed using the operation means, controlling, on the basis of detection information obtained by the motion detection means, a shutter operation in which the captured image data obtained by the image-capturing means is stored by the storage processing means after a self-timer set time period passes;
wherein;
the motion detection means detects the motion of the subject by performing image analysis of the captured image data obtained by the image-capturing means, the motion detection means detecting the motion of a person as the subject,
the control means controls the shutter operation on the basis of the detection information on the motion of the person by the motion detection means, and
on the basis of the detection information obtained by the motion detection means, the control means performs a process for extending the self-timer set time period when the person is moving when the self-timer set time period passes, and
on the basis of the detection information obtained by the motion detection means, the control means performs control so that the shutter operation is performed when detection information indicating that the person is stationary is obtained before an extension time period of the self-timer set time period passes.

11. An image-capturing apparatus comprising:
image-capturing means for capturing an image of a subject in order to obtain captured image data;
storage processing means for performing a process for storing the captured image data obtained by the image-capturing means;
operation means for performing a self-timer image-capturing operation;
motion detection means for detecting motion;
control means for, when the self-timer image-capturing operation is performed using the operation means, controlling, on the basis of detection information obtained by the motion detection means, a shutter operation in which the captured image data obtained by the image-capturing means is stored by the storage processing means after a self-timer set time period passes;
wherein:
the motion detection means detects the motion of the subject by performing image analysis of the captured image data obtained by the image-capturing means,
the control means controls the shutter operation on the basis of the detection information on the motion of the subject by the motion detection means;
on the basis of the detection information obtained by the motion detection means, the control means performs a process for extending the self-timer set time period when the subject is moving when the self-timer set time period passes;
the motion detection means detects the motion of the image-capturing apparatus;
the image-capturing means has an exposure correction function, and
on the basis of the detection information obtained by the motion detection means, the control means controls the image-capturing means so that exposure correction is performed when the amount of incident light from the subject is changed during the self-timer set time period.

12. An image-capturing apparatus comprising:
image-capturing means for capturing an image of a subject in order to obtain captured image data;
storage processing means for performing a process for storing the captured image data obtained by the image-capturing means;
operation means for performing a self-timer image-capturing operation;
motion detection means for detecting motion;
control means for, when the self-timer image-capturing operation is performed using the operation means, controlling, on the basis of detection information obtained by the motion detection means, a shutter operation in which the captured image data obtained by the image-capturing means is stored by the storage processing means after a self-timer set time period passes;

wherein:

the motion detection means detects the motion of the subject by performing image analysis of the captured image data obtained by the image-capturing means, the control means controls the shutter operation on the basis of the detection information on the motion of the subject by the motion detection means; and on the basis of the detection information obtained by the motion detection means, the control means performs a process for extending the self-timer set time period when the subject is moving when the self-timer set time period passes;

further comprising message output means;

wherein, on the basis of the detection information obtained by the motion detection means, the control means performs control for causing the message output means to output a message when detection information indicating that the image-capturing apparatus has moved during the self-timer set time period is obtained.

13. A method for performing image capturing using an image-capturing apparatus, the method comprising:

capturing an image of a subject as captured image data;

storing the captured image data;

performing a self-timer image-capturing operation;

detecting motion of the subject or of the image-capturing apparatus during the capturing;

controlling a shutter operation on a basis of a detection result of the detecting; and performing an exposure correction function when an amount of incident light from the subject is changed during self-timing.

14. An image-capturing apparatus comprising:

an image-capturing unit that captures an image of a subject as captured image data;

a storage processor that stores the captured image data;

an operation unit that performs a self-timer image-capturing operation;

a motion detector that detects motion of the subject or of the image-capturing apparatus during the capturing; and a controller that controls a shutter operation on the basis of a detection result, and an exposure correction function when an amount of incident light from the subject is changed during self-timing.

* * * * *